(12) United States Patent
Siemensmeyer

(10) Patent No.: US 11,624,216 B2
(45) Date of Patent: Apr. 11, 2023

(54) MOTOR VEHICLE LOCK

(71) Applicant: Kiekert AG, Heiligenhaus (DE)

(72) Inventor: Rolf Siemensmeyer, Moers (DE)

(73) Assignee: Kiekert AG, Heiligenhaus (DE)

( * ) Notice: Subject to any disclaimer, the term of this patent is extended or adjusted under 35 U.S.C. 154(b) by 478 days.

(21) Appl. No.: 16/313,917

(22) PCT Filed: Jun. 19, 2017

(86) PCT No.: PCT/DE2017/100512
§ 371 (c)(1),
(2) Date: Mar. 6, 2019

(87) PCT Pub. No.: WO2018/001410
PCT Pub. Date: Jan. 4, 2018

(65) Prior Publication Data
US 2020/0386015 A1    Dec. 10, 2020

(30) Foreign Application Priority Data

Jun. 28, 2016    (DE) .................. 10 2016 111 837.0

(51) Int. Cl.
*E05B 79/20*    (2014.01)
*F16C 1/26*    (2006.01)
(Continued)

(52) U.S. Cl.
CPC .............. *E05B 79/20* (2013.01); *F16C 1/262* (2013.01); *E05B 81/06* (2013.01); *E05B 81/20* (2013.01); *F16C 1/14* (2013.01); *F16C 2350/52* (2013.01)

(58) Field of Classification Search
CPC .......... E05B 79/20; E05B 81/06; E05B 81/20; F16C 1/14; F16C 1/262; F16C 2350/52
See application file for complete search history.

(56) References Cited

U.S. PATENT DOCUMENTS

| 2,493,841 A | 1/1950 | Threewit | |
| 7,029,194 B2 * | 4/2006 | Ishikawa | F16C 1/105 403/197 |

(Continued)

FOREIGN PATENT DOCUMENTS

| DE | 10106871 | 9/2001 | |
| DE | 10106871 A1 * | 9/2001 | ............ E05B 79/04 |

(Continued)

OTHER PUBLICATIONS

International Search Report and Written Opinion for corresponding Patent Application No. PCT/DE2017/100512 dated Sep. 6, 2017.
(Continued)

*Primary Examiner* — Kristina R Fulton
*Assistant Examiner* — James E Ignaczewski
(74) *Attorney, Agent, or Firm* — Renner, Otto, Boisselle & Sklar, LLP

(57) ABSTRACT

A motor vehicle lock includes a locking mechanism with a rotary latch and at least one pawl, an actuating lever which can directly or indirectly unlock the locking mechanism, and at least one Bowden cable. The Bowden cable, in particular the Bowden pull cable, has a spherical-shaped end piece and the end piece can be connected to the actuating lever. The Bowden cable is housed in the motor vehicle lock so it can rotate.

16 Claims, 2 Drawing Sheets

Figure 1:
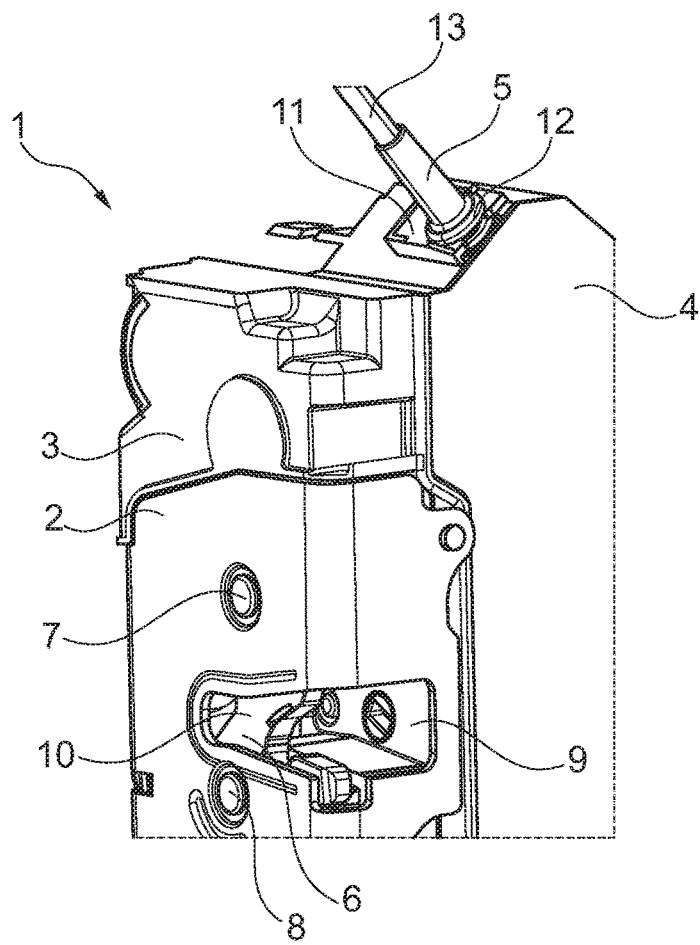

(51) Int. Cl.
  *E05B 81/06* (2014.01)
  *E05B 81/20* (2014.01)
  *F16C 1/14* (2006.01)

(56) References Cited

U.S. PATENT DOCUMENTS

| | | | | |
|---|---|---|---|---|
| 8,727,287 | B2 * | 5/2014 | Trouve | F16C 1/105 |
| | | | | 248/74.2 |
| 9,784,303 | B2 * | 10/2017 | Jang | F16G 11/00 |
| 10,006,228 | B2 * | 6/2018 | Kim | E05B 77/04 |
| 2006/0214467 | A1 * | 9/2006 | Usuzaki | E05B 77/44 |
| | | | | 296/146.1 |
| 2015/0143942 | A1 * | 5/2015 | Lalonde | B29C 70/766 |
| | | | | 74/502.5 |

FOREIGN PATENT DOCUMENTS

| | | | |
|---|---|---|---|
| DE | 10220732 | | 12/2003 |
| DE | 102013206889 | | 10/2014 |
| DE | 102014017485 | | 5/2015 |
| EP | 1079048 | | 2/2001 |
| JP | 2002139017 | | 5/2002 |
| JP | 2002139017 A | * 5/2002 | ............ F16C 1/265 |
| WO | 02/064985 | | 8/2002 |
| WO | WO-02064985 A1 | * 8/2002 | ............ F16C 1/105 |

OTHER PUBLICATIONS

Search Report of DE Application No. 10 2016 111 837.0 dated May 11, 2017.

\* cited by examiner

MOTOR VEHICLE LOCK

The invention relates to a motor vehicle lock comprising a locking mechanism with a rotary latch and at least one pawl, an actuating lever, which can directly or indirectly unlock the locking mechanism, at least one Bowden cable, said Bowden cable, in particular the Bowden pull cable, has a spherical end piece and the end piece can be connected to the actuating lever.

In today's motor vehicle locking systems or vehicle locks, locking mechanisms consisting of a rotary latch and a pawl are often used. In this case, the pawl locks the rotary latch when the rotary latch has been moved, for example, from a lock holder into a latching position. Such motor vehicle locks equipped with a locking mechanism are used, for example, in side doors, sliding doors, tailgates, bonnets, covers but also seat locks, to name only exemplary embodiments typically found in a motor vehicle. The motor vehicle locks are often not installed where the operator of the motor vehicle operates the locks, but the locks are applied to areas best suited for optimum closing of the area of the motor vehicle to be locked with the motor vehicle lock. Thus, the locking system may also be spaced apart from, for example, the external or internal actuating lever. In order to forward the movement initiated by the operator to the lock, for example, by using the outer handle, Bowden cables are preferably used. A Bowden cable offers the advantage that on the one hand long distances can be bridged and on the other hand it has the advantage that Bowden cables are easy to install in the motor vehicle.

For example, a Bowden cable can be operatively connected to the handle on one side of an external door handle and another end of the Bowden cable can be in contact with the vehicle lock. At the motor vehicle lock, the free end of the Bowden cable can then be connected to an actuating lever so that an indirect or immediate actuation or unlocking of the lock is possible. If the operator pulls the outer door handle, the pulling movement is transmitted to the vehicle lock and the lock can be unlocked by means of the actuating lever.

A Bowden cable usually has a Bowden cable sheath and a Bowden pull cable. The Bowden cable sheath is preferably firmly installed in the motor vehicle lock and, for example, the outside door handle. The Bowden pull cable, which preferably consists of a wire cable, however, is freely movable through the Bowden cable sheath. To operate the Bowden cable, the free ends of the Bowden cable are connected on the one hand to the motor vehicle lock and on the other hand, for example, to a door handle, so that a tensile and/or compressive movement is transferable.

For attaching or connecting the Bowden cable with an actuating lever in a motor vehicle lock, various solutions for connecting the Bowden cable are known.

DE 10 2013 206 889 A1 describes a drive unit working together with a Bowden cable. Such drives, which are also known as microdrives in motor vehicles, are used, for example, for the electrical opening of such items as a fuel filler flap. The disclosed solution shows a possibility with which a drive unit can transmit tensile and compressive forces via the Bowden cable. For this purpose, the Bowden cable is provided with a connection hook which engages positively in a bolt of the drive unit. Due to the engagement conditions between the Bowden pull cable and bolt, tensile and compressive movements can be transmitted by means of the Bowden cable, since the hook-shaped connection with the drive unit forcibly guides the Bowden pull cable.

U.S. Pat. No. 2,493,841 A1 describes a control unit that can exert a tensile force on a Bowden cable. To connect the Bowden cable to an actuating lever, a coupling element is provided on the actuating lever, which has a connection part. The connecting part is firmly connected to the coupling element and has a bore hole into which a spherical end of a Bowden cable can be inserted. To fasten the spherical end of the Bowden cable, the edge of the bore hole is bent in the connecting part. The spherical end is thus fastened in the connection part. Due to the spherical end piece, an articulated connection of the Bowden cable is given, requiring a complex assembly of the end piece of the Bowden cable and a secure and trouble-free connection of the end piece is not necessarily achieved. In particular, the connection of the end piece is dependent on a shaping deformation of the connection part, which is hardly feasible in difficult to reach areas which means there is a risk of jamming of the end piece and thus a malfunction. In addition, a double spherical connection of spherical end piece and coupling element is structurally complex and therefore costly.

The object of the invention is to provide an improved motor vehicle lock. In addition, it is an object of the invention to produce a secure and uniform power transmission between the Bowden cable and the actuating lever, which on the one hand allows for easy assembly and at the same time makes a twisting of the Bowden cable possible. Moreover, it is an object of the invention to provide a structurally simple and cost-effective way to ensure a reliable and definable power transmission.

The object is solved according to the invention by the characteristics of the independent patent claim 1. Advantageous designs of the invention are specified in the sub-claims. It is pointed out that the exemplary embodiments described hereafter are not restrictive; instead, any possible variations are possible of the characteristics described in the description, the sub-claims and the drawings.

According to claim 1, the object of the invention is achieved in that a motor vehicle lock is provided comprising of a locking mechanism with a rotary latch and at least one pawl, an actuating lever, wherein by means of the actuating lever the locking mechanism is indirectly or directly unlocked, at least one Bowden cable, wherein the Bowden cable in particular the Bowden pull cable has a spherical end piece and the end piece can be connected to the actuating lever and wherein the Bowden cable is rotatably installed in the motor vehicle lock. The invention-based design of the motor vehicle lock now makes it possible to twist the Bowden cable without causing distortion and/or malfunctions in the motor vehicle lock. This enables the actuating lever to be actuated safely at all times.

In particular, the continuous movement of the Bowden cable, which can be introduced into the Bowden cable, for example via an internal or external actuating lever, leads to a twisting of the Bowden cable, which is mostly based on the transmission of stresses and/or the laying of the Bowden cable in the motor vehicle. This rotary movement can be carried out by means of a pivotable holder of the Bowden cable in the motor vehicle lock, so that tensioning and/or movement of the Bowden cable, in case of force being applied, can be eliminated by a rotary movement of the Bowden cable in the holder of the motor vehicle lock. In an advantageous way, twisting and/or tensioning of the Bowden cable thus does not lead to malfunctions, so that a safe actuation of the actuating lever can be achieved.

A motor vehicle lock within the meaning of the invention is equipped with a latch consisting of a rotary latch and at least one pawl. The lock can only have a latch position, but it can also, for example, have a pre-latch and/or a main latch position. The pawl can be one-piece or multi-piece and interact with different areas of the rotary latch. The locking mechanism can be unlocked by means of the actuating lever. Unlocking takes place either directly above the engagement of the actuating lever on the rotary latch, preferably the pawl, or alternatively indirectly via the actuating lever. Indirect means that the actuating lever does not act directly on the pawl, but, for example, actuates a release lever itself, which can then release the pawl from engaging in the rotary latch.

The Bowden cable can be connected to the actuating lever on one side of the vehicle lock. The Bowden cable has a spherical end piece that can be connected to the actuating lever. The spherical end piece can, for example, be shaped and connected to the Bowden pull cable consisting, for example, of a steel cable. Depending on the material of the Bowden pull cable, the spherical end piece can also be designed in one piece with the Bowden pull cable. For the connection of the spherical end piece to the Bowden pull cable, the usual joining methods are available, such as material-locking, force-locking or positive-locking connection.

The pivoting mounting of the Bowden cable in the motor vehicle lock ensures that the connection of the spherical end piece to the actuating lever can be guaranteed at any time when the motor vehicle lock is actuated. In particular, twists of the Bowden cable can be absorbed so that a rotary movement has no influence on the actuation of the actuating lever.

In an advantageous design of the invention, the Bowden cable has a joining means. The joining means can be formed as a single piece with the Bowden cable sheath or as a separate component in operatively connected with the Bowden cable sheath. The joining means is designed in such a way that free rotation of the Bowden cable sheath in the holder of the motor vehicle lock is guaranteed. Preferably, a positive connection between the Bowden cable sheath and a lock housing of the motor vehicle lock is conceivable according to the invention.

The joining means, for example, can be formed ring-shaped around the Bowden cable. The advantage of a ring-shaped, circumferential joining form on the Bowden cable is that these symmetrical structures can be easily produced. Preferably, the joining means can be mounted in a ring or shaped in one piece with the Bowden cable. At the same time, a ring-shaped circumferential bracket as a joining means also offers the advantage that the engagement conditions between the mounting in the motor vehicle lock and the means of joining are uniform at all times when the Bowden cable is twisted. In addition, ring-shaped circumferential joining means can be easily mounted. The ring-shaped and thus symmetrical design offers the advantage that incorrect assembly can be ruled out.

In a design form of the invention, the joining means can be inserted into a housing of a motor vehicle lock housing. The motor vehicle lock preferably has a plastic lock housing, which is usually enclosed in at least some areas by a metallic lock plate. The lock plate serves to accommodate the locking mechanism or the locking mechanism bearing. If the housing has a receptacle into which the joining means can be inserted, on the one hand the joining of the Bowden cable can be facilitated and on the other hand the receptacle can be used to secure the bearing of the Bowden cable. The receptacle can also be made up of several housing parts of the lock. On the one hand, there may be a multi-part housing cover or the receptacle may consist of a lock housing and a lock cover. The housing parts to be joined can form the receptacle. A receptacle can hold the joining means positively and thus promote twisting of the Bowden cable. In addition to guiding the joining means, the receptacle also serves as a bearing point for the Bowden cable sheath, so that on the one hand joining and on the other hand safe positioning of the Bowden cable can be guaranteed.

If the joining means can be inserted into the receptacle, this results in a further advantageous embodiment of the invention. If the receptacle is designed such that the joining means can be inserted into the receptacle in a form-fitting manner, for example, easy mounting can be ensured. In addition, it is also possible to use a joining safety device during insertion. If, for example, the joining means is inserted into an opening in the lock housing, a snap-in device and/or a spring element can be used, for example, to make the joining means snap into place haptically and/or acoustically for the fitter, so that reliable assembly can be guaranteed. In addition, the securing means can increase the functionality of the Bowden cable connection to the motor vehicle lock.

In another design version of the invention, there is an advantage if the actuating lever has an opening, where the end piece can be inserted into the opening. The direct connection of the Bowden pull cable to the actuating lever offers a cost-effective way of connecting the Bowden cable to the actuating lever. An opening in the actuating lever can on the one hand facilitate mounting and on the other hand prevent the end piece from slipping out of the actuating lever. If, for example, the opening in the control lever is arranged in such a way that the opening facing away from the direction of pull is formed in the control lever, then falling out or disengaging of the Bowden pull cable during operation of the control lever can be ruled out.

However, the opening in the actuating lever can also be a joint safety device at the same time, if the spherical area of the end piece is not completely circular but, for example, flattened. If the opening in the actuating lever is then adapted to the flattening in the spherical end piece, so that the end piece can be mounted only in one direction, and if this mounting direction does not correspond to the pulling direction, an external engagement between Bowden pull cable and actuating lever if operated can be excluded.

If the actuating lever is formed from a sheet metal strip, the invention is then implemented in another form. On the one hand, forming the actuating lever from a sheet metal strip is inexpensive and at the same time a sheet metal strip can be easily formed. This makes it a cost-effective and adaptable way to connect the actuating lever to the Bowden cable. In particular, an opening for mounting the Bowden cable, for example, as well as a contact position of the end piece on the actuating lever can be easily formed.

Thus, for example, the end piece contact as well as the opening for assembly can be inserted into the actuating lever before the actuating lever is formed for a cost-effective production of the actuating lever. In addition to the technical production advantages, an actuating lever made of a sheet metal strip offers the advantage that a sheet metal strip has a low weight, which in turn benefits the weight of the motor vehicle lock. In addition, a sheet metal strip made of a steel material, for example, can absorb high forces so that reliable and durable operation of the motor vehicle lock can be guaranteed.

In a further design version of the invention, the opening for joining the end piece can be inserted in a shaped area of the sheet metal strip. The production of the opening in a shaped area of the sheet metal strip is technically favorable and also offers the advantage that a favorable position for the assembler to join the end piece can be provided. In addition, the assembly, i.e., insertion of the end piece into the formed area, offers the advantage that at the same time a holding device for the end piece can be formed. The formed area can form a contour which is adapted to the end piece. Thus, a positive connection between the end piece and the metal strip in the assembled position can be produced. Thus, if the position fixing is made in the mounted position of the Bowden cable, the deformation can be carried out simultaneously such that the metal strip additionally secures the end piece in the inserted position or holds the end piece in the inserted position. To secure the joint and/or the position, the sheet metal strip can have one, two or more deformations.

In addition, the opening can be used to prevent the end piece from releasing itself from the actuating lever. This can be another design version of the invention if the end piece has an extension. If the opening is designed in such a way that the end piece, for example, can only be joined in one direction, whereby the joining direction differs from the actuating direction for the actuating lever, the extension can be used to prevent the Bowden cable from releasing itself from the actuating lever. If, for example, the actuating lever in the motor vehicle lock is arranged such that the actuating lever functions together with a stop, the end piece can be moved out of contact with the actuating lever against the direction of pull due to tolerances or actuation of the Bowden cable. If the end piece has an extension, the end piece cannot be moved out of the joined position through the opening, as the extension prevents the end piece from moving out of the opening.

In an advantageous design version of the invention, the extension extends in the direction of a Bowden pull cable and at an end of the end piece opposite to the Bowden pull cable. By an extension, which extends quasi in the actuation direction of the Bowden pull cable, on the one hand an easy producibility is ensured and at the same time the actuation lever can be easily produced, for example, with a circularly describable joint opening. The extension offers a figurative extension of the Bowden pull cable over and beyond the end piece. An extension can also be formed, for example, by a part of the Bowden pull cable extending beyond the end piece.

In the following, the invention is explained in more detail with reference to the attached drawings using a preferred execution example. However, the principle applies that the exemplary embodiments do not restrict the invention, but only constitute advantageous embodiments. The illustrated characteristics can be executed individually or in combination with further characteristics of the description and also the patent claims individually or in combination.

Figure 2:
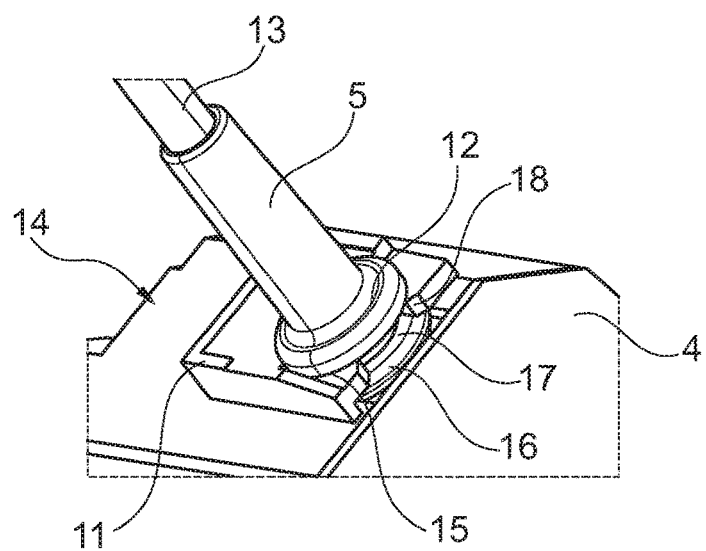
Figure 3:
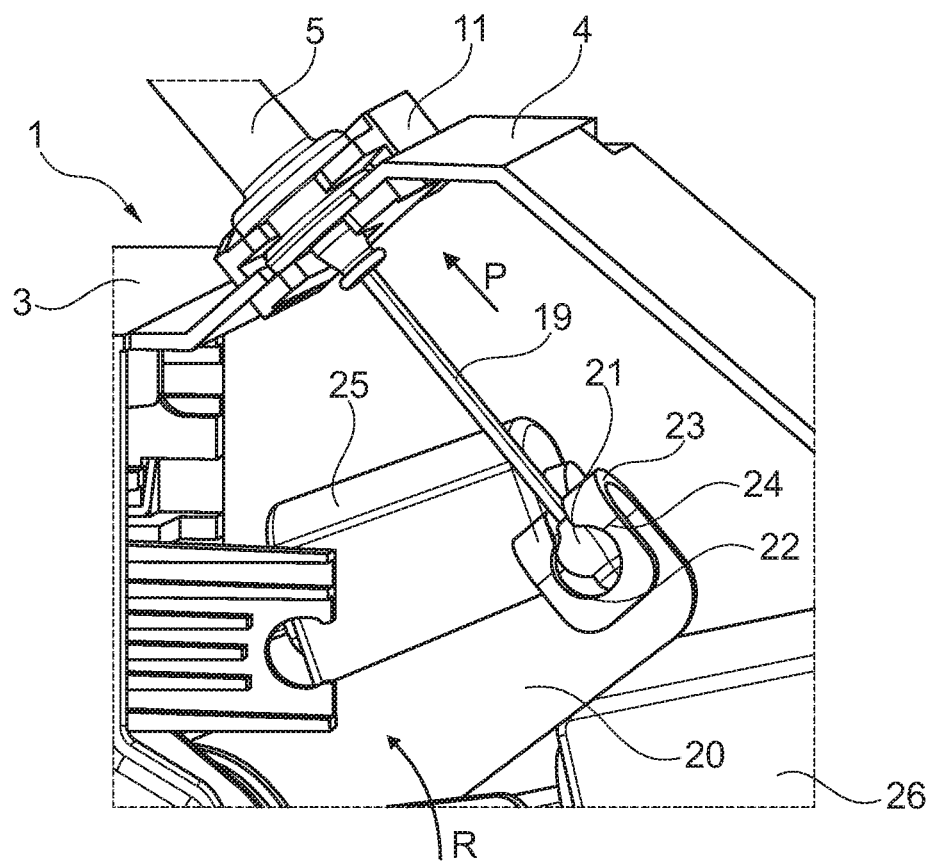
Figure 4:
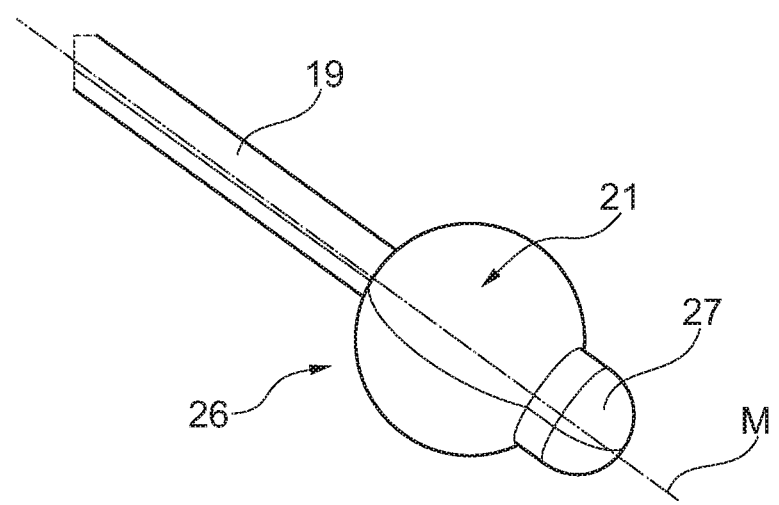

The following are shown:

FIG. 1 a three-dimensional view of a motor vehicle lock with a Bowden cable mounted FIG. 2 an enlarged view of the connection area of the Bowden cable to the motor vehicle lock FIG. 3 a three-dimensional representation of the mounted Bowden cable and the connection of the Bowden cable to an actuating lever FIG. 4 a detailed view of the Bowden pull cable with an end piece FIG. 1 shows a motor vehicle lock 1 in a three-dimensional representation. The motor vehicle lock 1 has a lock case 2, a lock housing 3, a lock cover 4 and a Bowden cable 5. In lock case 2, a lock 6 is pivotably mounted, whereby the locking mechanism axes 7, 8 are accommodated in lock case 2. Through an inlet opening 9 of the lock case 2 and the lock housing 3, the rotary latch 10 can be seen as part of the locking mechanism 6 in an open position.

The lock cover 4 can be constructed in one piece or several and can, for example, be connected to the lock housing 3 and/or the lock case 2 by means of a clip connection and/or a screw connection. The lock cover 4 is only shown schematically in some areas.

Lock cover 4 features a receptacle 4 for a joining means 12. The joining means 12 can be designed as a single piece or as a separate component with the Bowden cable sheath 13.

FIG. 2 shows an enlarged representation of the connection area 14 on the lock cover 4. Same components are provided with the same reference symbols. As can be clearly seen, the joining means 12 is designed as a circular circumferential thickening, whereby two circular circumferential thickenings 15, 16 are designed as joining means 12, forming a groove 17.

The groove 17 and the thickenings 15, 16 can be slipped into place laterally into the receptacle 11. The receptacle 11 can have a clamping safety device 18 so that the Bowden cable 5 is securely held in the lock cover 4.

FIG. 3 shows an open motor vehicle lock 1. You can see the Bowden cable 5 inserted in receptacle 11, whereby the Bowden pull cable 19 extends up to an actuating lever 20. The actuating lever 20 in this design version is designed as a sheet metal strip. The Bowden pull cable 19 has an end piece 21 at its end, which is inserted into an opening 22 of the actuating lever 20. The end piece 21 is positively held in the actuating lever 20. The actuating lever 20, in the form of a sheet metal strip, has a first deformation 23, which requires a positive fit with the end piece, and a second deformation 24, which represents a position securing for the end piece.

The actuating lever 20 is mounted in the motor vehicle lock so that it can be swiveled. In addition, motors are depicted that serve, for example, for a central locking or electrical opening.

The Bowden pull cable 19 can be moved in the direction of the arrow P. For example, the Bowden cable 5 can be operatively connected to an outer door handle, so that after pulling the door handle, the Bowden pull cable 19 can be moved in the direction of the arrow P. The movement of the Bowden pull cable 19 causes the actuating lever 20 to move in the direction R and thus counterclockwise.

FIG. 4 shows an enlarged representation of the end piece 21 in an end area 26 of the Bowden pull cable 19. The Bowden cable 19 has an extension 27 next to the end piece 21, which can serve as a position securing and positioning safety device. The extension 27 extends along a central axis M of the Bowden pull cable 19. End piece 21 and extension 27 are preferably constructed symmetrically. The design of connection area 14 and end area 26 according to the invention provides a safe connection between Bowden cable 5 and vehicle lock 1. In addition to the advantages of easy assembly and cost-effective manufacturability, a high degree of operational reliability is also provided.

| List of reference symbols | |
|---|---|
| 1 | Motor Vehicle Lock |
| 2 | Lock case |
| 3 | Lock housing |
| 4 | Lock cover |
| 5 | Bowden cable |
| 6 | Locking mechanism |
| 7, 8 | Locking mechanism axes |
| 9 | Inlet opening |

-continued

List of reference symbols

| | |
|---|---|
| 10 | Rotary latch |
| 11 | Receptacle |
| 12 | Joining means |
| 13 | Bowden cable sheath |
| 14 | Connection area |
| 15, 16 | Thickenings |
| 17 | Groove |
| 18 | Clamping safety device |
| 19 | Bowden pull cable |
| 20 | Actuating lever |
| 21 | End piece |
| 22 | Opening |
| 23 | First deformation |
| 24 | Second deformation |
| 25, 26 | Motors |
| 26 | End area |
| 27 | Extension |
| P | Arrow |
| R | Direction |
| M | Central axis |

The invention claimed is:

1. A motor vehicle lock comprising:

a locking mechanism with a rotary latch and at least one pawl;

a housing in which the locking mechanism is accommodated;

a lock cover connected to the lock housing;

an actuating lever which can directly or indirectly unlock the locking mechanism;

at least one Bowden cable having a Bowden pull cable with a spherical end piece that is connectable to the actuating lever;

a receptacle attached to an outer surface of the lock cover where the at least one Bowden cable exits the lock cover; and a joining bracket that receives the Bowden cable, wherein the joining bracket configured to enable twisting of the Bowden pull cable about an axis of the Bowden pull cable through the joining bracket, wherein the joining bracket is configured to be laterally inserted into the receptacle along the outer surface of the lock cover, and the receptacle is configured to clamp the joining bracket in position, the joining bracket being at least partly arranged outside the receptacle and providing a bearing point for the Bowden pull cable, the Bowden pull cable extending outside the receptacle and the lock cover at the bearing point;

wherein a lock cover portion of the lock cover is received within the receptacle such that a first portion of the receptacle is located internally within the lock cover and a second portion of the receptable is located externally from the lock cover;

wherein the joining bracket includes a first thickening and a second thickening that define a grove; and the first portion of the receptacle is located within the groove of the joining bracket, and the second thickening of the joining bracket abuts against the lock cover portion that is received within the receptacle, wherein the actuating lever is wholly contained within a cavity formed by the housing and the lock cover.

2. The motor vehicle lock according to claim 1, wherein the joining bracket is formed annularly and circumferentially on the Bowden cable.

3. The motor vehicle lock according to claim 1, wherein the joining bracket is slideable into the receptacle.

4. The motor vehicle lock according to claim 1, wherein the actuating lever has an opening, the end piece being insertable into the opening.

5. The motor vehicle lock according to claim 4, wherein the actuating lever is formed from a sheet metal strip.

6. The motor vehicle lock according to claim 5, wherein the end piece is insertable in a deformed region of the sheet metal strip.

7. The motor vehicle lock according to claim 1, wherein the end piece has an extension.

8. The motor vehicle locking device according to claim 7, wherein the extension extends in a direction of the Bowden pull cable and at an end of the end piece opposite the Bowden pull cable.

9. The motor vehicle locking device according to claim 8, wherein the end piece and the extension are arranged along a common axis.

10. The motor vehicle locking device according to claim 1, wherein the joining bracket is formed as a single piece with a sheath of the Bowden cable.

11. The motor vehicle locking device according to claim 1, wherein the actuating lever has a first deformation which has a positive fit with the end piece.

12. The motor vehicle locking device according to claim 11, wherein the actuating lever has a second deformation that is configured for securing a position of the end piece.

13. The motor vehicle locking device according to claim 1, wherein the actuating lever is configured to swivel.

14. The motor vehicle locking device according to claim 1, wherein the receptacle includes a clamping device for securely holding the Bowden cable in the lock cover.

15. The motor vehicle locking device according to claim 1, further comprising a lock case that is connectable to the housing and to the lock cover.

16. The motor vehicle locking device according to claim 1, wherein the receptacle is formed as a separate body relative to the lock cover and is connected to the lock cover by a mechanical connection.

* * * * *